United States Patent [19]

Briesemeister

[11] Patent Number: 5,040,361
[45] Date of Patent: Aug. 20, 1991

[54] SNAPPING ROLLER FOR A CORN HARVESTING COMBINE

[75] Inventor: Richard A. Briesemeister, Clear Lake, Wis.

[73] Assignee: Pixall Corporation, Clear Lake, Wis.

[21] Appl. No.: 485,951

[22] Filed: Feb. 27, 1990

[51] Int. Cl.⁵ .................................. A01D 45/00
[52] U.S. Cl. ................................. 56/52; 56/104
[58] Field of Search ............ 56/52, 103, 104, 117; 460/27, 31, 32, 26, 29

[56] References Cited

U.S. PATENT DOCUMENTS

| | | | |
|---|---|---|---|
| 2,538,965 | 1/1951 | Fergason | 460/32 X |
| 2,604,750 | 7/1952 | Fergason | 56/104 |
| 3,100,491 | 8/1963 | Dillon | 56/104 |
| 3,606,743 | 9/1971 | Johnson | 56/104 X |
| 4,233,804 | 11/1980 | Fischer et al. | 56/104 |
| 4,238,916 | 12/1980 | Kesl et al. | 56/104 X |

Primary Examiner—Thuy M. Bui
Attorney, Agent, or Firm—Moore & Hansen

[57] ABSTRACT

An aggressive, high capacity snapping roller is formed from a multiplicity of elongated narrow rails to define a cylindrical segmented roller having stronger, more rigid and more evenly spaced blades which are integral with each rail. Individual rails include an arcuate cross section wall defining segment and an integral, angled, uniformly sharpened blade. A single row of intermittently spaced welds joins each adjacent pair of rails together and allows a low friction, unobstructed channel between blades. A method for making the roller is also disclosed.

43 Claims, 2 Drawing Sheets

SNAPPING ROLLER FOR A CORN HARVESTING COMBINE

BACKGROUND OF THE INVENTION

The invention relates to the field of snapping rollers for corn harvesting combines and more specifically to the structure and manufacturing of a high capacity roller suitable for high speed picking of sweet, field and seed corn under a wide range of crop moisture levels and adverse weather and field conditions. A method for making the new roller is also disclosed.

Corn harvesting combines utilize one or more pairs of headers positioned forwardly of the combine, with each pair of headers engaging a row of upright corn stalks therebetween as the combine moves forward Each such pair of headers has a pair of rotating, cooperating snapping rollers with outwardly extending blades or protrusions which endeavors to grip the corn stalks therebetween and pulls the stalks downwardly while the corn ears are removed. It is crucial that, until the corn ears are removed, the stalk not be severed by the rollers because the stalk must be gripped by the rollers and pulled downwardly through the rollers in order to snap off the corn ears against plates positioned above and adjacent the snapping rollers. Should any stalk be cut or broken above the rollers, the remaining upright portion of the stalk and any corn ears on it will either fall away to the side of the combine and be lost in the field or both the corn ears and the attached stalk will fall into the combine. It is important to prevent such stalks from entering the combine screens with the picked ears because the unwanted stalks and leaves produce extra wear on internal combine parts, more clogging and overall less efficient operation when such trash and residue must be processed through the combine. As the ears are removed from the stalk, the stalk is pushed downwardly toward the ground by the rollers and dropped in the field to eventually dry out and decompose.

Ideally, no stalks should enter the combine screens with the ears and they should be discarded in the wake of the combine. Since the discarded stalk residue must usually be cut or chopped up before new plowing or seeding can be done, it is desirable that the stalk undergo as much breakage and deterioration as possible during combining without allowing it to break before the ears are picked.

Since the invention of corn harvesting combines, many snapping roller designs have been developed. Most designs work satisfactorily when the combine moves at slow ground speeds in moderately dry corn and under reasonably dry field and weather conditions. As ground travel speed increases to the 3 to 8 m.p.h. range, the performance of now available rollers steadily, significantly deteriorates with increasing numbers of stalks breaking off before ear removal and either the entire stalk and ears being lost to the harvest or the broken stalks falling into the combine screening system. The faster the ground speed becomes, the more the snapping rollers clog up and more stalks break prior to corn ear removal.

Corn harvesting must often be done late in the growing season, just before freezing, and at times when weather is unpredictable at best. Often the crop is wet from rain, the field muddy, and cool temperatures allow little chance of rapid drying. Often the farmer must harvest his crop within a short time interval or risk its loss or deterioration due to worsening weather. When time is short, it can be essential to harvest even in rainy, wet field conditions, and it becomes important to be able to harvest at higher speeds under adverse field, weather and crop conditions.

Some corn crops, like sweet corn, are harvested when the stalks are still green and contain high levels of moisture. Such stalks are far more prone to slip during snapping roller engagement than are dryer stalks. Moist stalks are also more resistant to breakage. All varieties of corn differ in ways which affect snapping roller performance, as for example moisture content, stalk thickness, ear size, ear placement, and fiber consistency of the stalk, any of which can help or hinder snapping roller operation. Moisture conditions of individual corn stalks may vary widely even on a single farm, with stalks in low areas being wet and those on higher ground being dry. Since many of these parameters change so rapidly as to be unknown or unpredictable, it is important that snapping rollers be able to operate at higher speeds under most conditions that will be encountered, and regardless of the crop's moisture level or specific physical characteristics.

As optimum picking performance by the snapping rollers is achieved, it is desirable to also have the rollers achieve a high level of mutilation and breakage of stalk residue after the ears have been removed, so as to minimize subsequent independent stalk cutting steps with disks, specialized stalk shredders and the like, since plowing and seeding for the next crop cannot begin until the stalks are well broken up and decomposed. Prior art rollers have generally been unsuccessful in destroying the stalk residue and the farmer must make repeated passes with disks and shredders to prepare the field for plowing In some specialized crop situations, it is essential to produce dramatic stalk destruction with the rollers In the seed corn industry, it is required that rows of male corn plants be promptly and completely destroyed after fertilization has been accomplished, and an improved snapping roller would be helpful.

Designing a snapping roller capable of high capacity operation in wet, muddy, field conditions and which works for most corn varieties over a full range of dry and moist stalk conditions has been challenging to designers, with most designs showing promise at low to moderate speeds and dry conditions but failing increasingly at high speed operation under wet field and stalk conditions. It has been difficult to predict the performance of roller designs without extensive testing under widely varying weather, crop and speed conditions Even slight mechanical changes in a roller are capable of producing unexpected changes in corn picking and handling.

Always complicating the designing of the roller is that the roller must be aggressive enough to firmly grip the stalks and pull them downward under all speed, weather, crop and stalk moisture conditions so as to pick the corn ears without damaging the ears. After successful picking, it should badly mutilate and break the stalks. However, the roller cannot be so aggressive that it severs the stalk, breaks the stalk, or loses control of the stalk before the ears are removed. Satisfying these contradictory parameters makes design difficult and unpredictable.

Many variations of snapping roller configurations are known to the art and utilized in corn harvesting. Most snapping rollers have a central, one piece cylindrical steel core, and outwardly extending stalk engaging blades are then attached to the cylindrical core. Snapping rollers of this type are expensive to manufacture because they must be provided with apertures and slots in the core for connecting the rollers to the drive shafts of the combine and these apertures and slots must usually be drilled or milled because the cylindrical steel cores are not suitable for a stamping operation.

Snapping rollers have also utilized square cross section, elongated central cores, with flat blades being bolted to each side of the core to obtain a roller with four blades extending outwardly and spaced at 90' intervals. These structures tend to clog under high speed operation or with high moisture corn stalks, and such clogging results in the stalks breaking off before the ears can be removed. This configuration and variations of it are shown in U.S. Pat. Nos. 2,604,750 and 3,100,491, the '491 patent illustrating snapping rollers having L-shaped brackets which carry one or two blades bolted to a cylindrical core.

Another snapping roller configuration, shown in U.S. Pat. No. 4,233,804, utilizes a hexagonal cross section core and attaches three U-shaped cutting blades with such blades being bolted to three alternate faces of the hexagonal core to provide six outwardly extending blades A variation, of this mounting arrangement is shown in U.S Pat. No. 2,538,965 in which U-shaped blades are mounted to a round cross sectional core.

Still a further known snapping roller configuration utilizes a round central core with outwardly extending, longitudinally raised nubs. While this arrangement is effective with dry stalks, it incurs slippage and loses more and more stalks as speeds increase or stalk moisture levels rise. It is highly desirable to reduce slippage between the rollers and the stalks, because with reduced slippage, it is possible to attain higher ground speeds and harvest the corn.

Figures 1, 2, 3, 5:
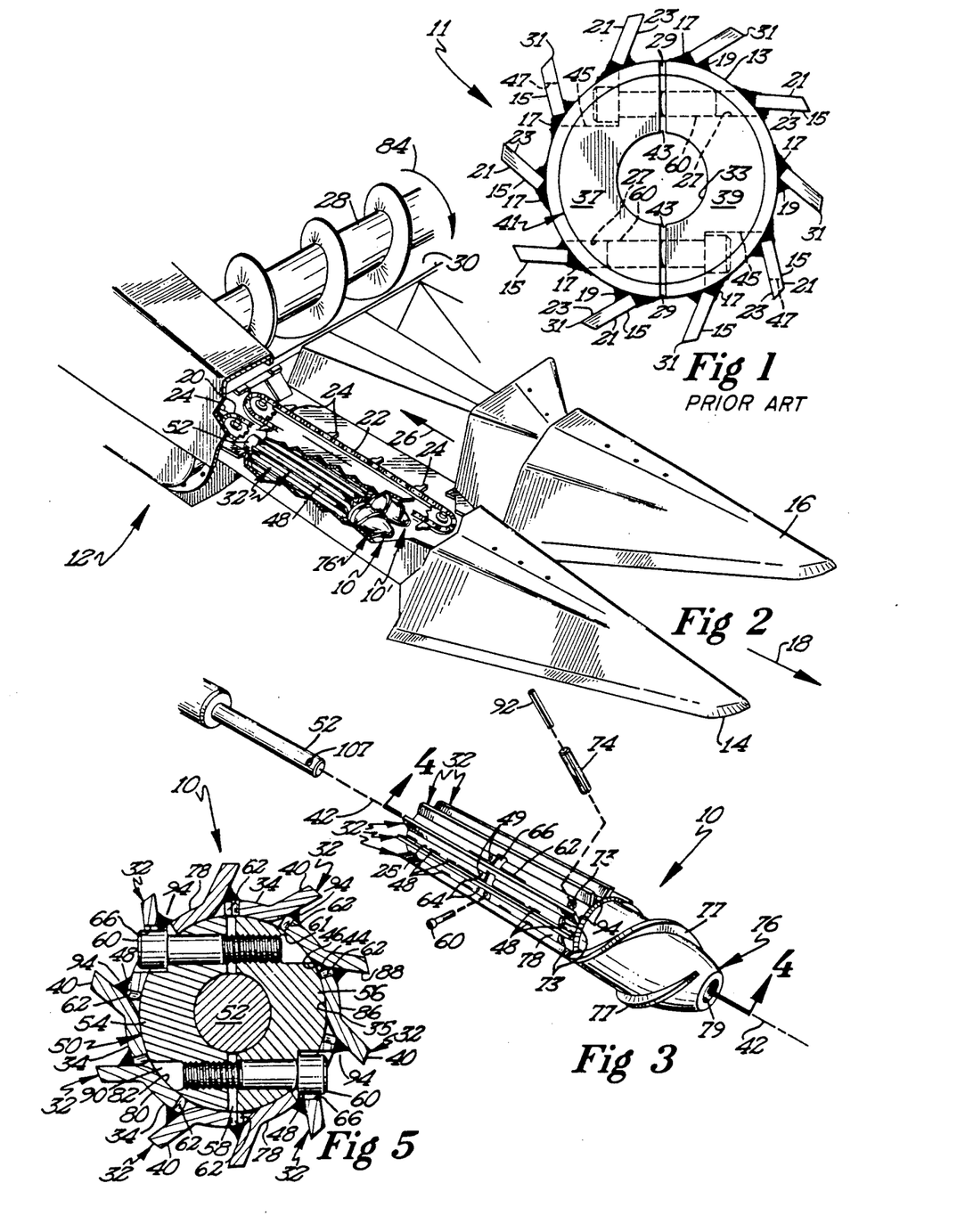
FIG. 1 is an end view of a prior art snapping roller used for the harvesting of corn.
FIG. 2 is a perspective view, taken partly in section, showing the front end of a corn harvesting combine and a pair of snapping rollers embodying the invention.
FIG. 3 is an exploded perspective view showing a high capacity corn harvesting snapping roller embodying the invention and aligned with the drive shaft of a combine.
FIG. 5 is a cross sectional end view of the snapping roller of FIG. 4 taken along cutting plane 5—5 of FIG. 4 and showing an intermediate mounting collar.

The most effective known high speed capacity snapping roller for handling stalks under a wide range of moisture, field, and weather conditions is snapping roller 11 of FIG. 1 wherein a hollow, cylindrical core 13 has ten outwardly extending blades 15 which cooperate with a second similar, but mirror imaged roller to grip the corn stalks therebetween The roller 11 was developed by the assignee of the present invention.

Each blade 15 is attached to the core 13 at approximately a 45 degree angle by front and rear welds 17 and 19, with the welds 17 being spaced intermittently along the length of the front surface 21 of each blade and the welds 19 spaced intermittently along the length of the rear surface 23 of each blade. These blades 15 extend along the full length of the cylindrical core, and the assembly and welding of such blades to the core is time consuming and labor intensive. The blades cannot be welded to the core continuously all along the intersections between the blade and the core, because the required high welding temperatures warp and distort the blades badly. Consequently, intermittent welds are used, and, even then, welding temperatures produce blade warp and distortion. Such distortion and warping result in non-parallel blades 15, non-parallel blade edges 31, irregular spacing between blades, and non-uniform angles between blade and core. The many required, rough welds 17 which are positioned quite centrally in the channels between adjacent blades 15, will snag corn stalk fibers and encourage stalk residue buildup on the roller. The inventor believes that when large quantities of stalks are processed by the roller, the blades 15 flex at both the cutting edges 31 and along the core 13 between the intermittent welds. This flexing causes the channels between blades to enlarge and contract, and the bottleneck effect of a narrowing channel will cause clogging, slippage and lost stalks. Despite these problems, this blade structure is more resistant to clogging than most other rollers and until the present invention worked better than other known rollers at all speeds, crop and weather conditions, as well as being more destructive of the stalk residue.

The roller 11 is attached to the drive shaft of a combine by sliding the drive shaft within the aperture 33 between elements 37 and 39 of split collar 41 which is fixed to the inside of the cylindrical core 13 near the middle of the roller. A gap 43 is provided between elements 37 and 39 to allow tightening of the elements against the drive shaft. In order to permit the elements 37 and 39 to converge toward the drive shaft, it is necessary to mill a short pair of slots 29 through the core 13 parallel to the central longitudinal axis of the roller 11. Such milling must be done after assembly of the roller 11 and is slow, costly and labor intensive. It is also necessary to drill and mill access slots 45 and 47 in the core 13 and blade 15, respectively, to allow insertion and turning of machine bolts 60 into threaded apertures 27 of the collar 41. At the front end of the roller 11, a transverse aperture must also be drilled in the core to receive a roll pin which passes through the core, through a front internal collar and through the drive shaft. All such cutting is time consuming and drives the cost of the roller 11 upward. The new invention described hereafter avoids the expensive milling and drilling operations, simplifies manufacture of the roller and lowers its cost.

SUMMARY OF THE INVENTION

The invention comprises a high capacity aggressive snapping roller for corn harvesting combines which is effective at all operational speeds for sweet and field corn harvesting under a wide range of stalk moisture conditions. The rollers function well even in wet weather and muddy field conditions and allow sustained higher harvesting speeds in the 4 to 8 m.p.h. range, during which few stalks are lost, broken or severed until the corn ears have been removed, and then greatly increased stalk mutilation is achieved so as to reduce the need for further cutting of the stalks.

The high speed roller uses a multiplicity of discrete steel rails, each having an elongated, outwardly projecting blade and an integral wall defining segment. Each of the wall defining segments has an arcuate cross section whose radius is substantially equal to that of the radius of the roller and which cooperates with the arcuate cross section segments of adjacent rails to collectively form and define a segmented cylindrical walled roller when the rails are joined together. The invention provides a snapping roller without the traditional one piece central core to which the blades have traditionally been attached.

Because the individual rails are formed from plates which are initially flat, the plates can have all required apertures formed therein by automatic punch machines before assembly of the rails into the snapping roller, thereby eliminating the more expensive drilling and milling operations now required of the most effective snapping rollers.

The improved roller has exceptionally uniform alignment of its blades because the blades are not warped and distorted by excessive welding during assembly, and making each blade integral with the wall defining segments reduces flexing of the blade relative to the core and produces better performance The expensive, time consuming welding required by the most effective prior art rollers is reduced by half and production speed increased accordingly.

Because of the reduced number of welds used in assembling the roller and their placement in an alcove sheltered from the main flow path of corn stalks, the channels between the blades are smoother, relatively unobstructed, and offer less resistance to corn stalk movement The very rigid blades resulting from the invention are more regularly spaced and have more uniform cross sections which do not have narrowed, bottlenecked sections therealong. These improvements, wherein the blades are substantially stationary and unflexing relative to the core, reduce clogging of the rollers during high capacity operation and permit faster and more effective harvesting even at high speed with corn having high moisture content.

The blades of the roller, working in cooperation with a second roller, effectively cut into the corn stalk without severing it or breaking it, thereby effectively gripping the corn stalk with little slippage while stripping all the ears therefrom. As the rollers solidly grip the stalk, the stalk is moved quickly through the rollers and, after removal of the ears, is rammed against the ground, sometimes several times depending on ground speed, and the stalks badly broken and shattered. The cutting and shattering accelerates the drying and decomposition of the stalk. The invention allows the production of a more effective roller, reduces the amount of labor intensive welding, and eliminates most drilling and milling required of earlier comparable devices.

These and other objects and advantages of the invention will appear more fully from the following description made in conjunction with the accompanying drawings wherein like reference characters refer to the same or similar parts throughout the several views.

DESCRIPTION OF THE PREFERRED EMBODIMENTS

Referring now to FIG. 2, the front end of a corn harvesting combine 12 has headers 14 and 16, each of which is equipped with a snapping roller 10 and 10', respectively, which embodies the invention, the rollers being structured to firmly engage corn stalks therebetween as the headers move forwardly in direction 18. Positioned along and lateral of each of the snapping rollers are gathering chains 20 and 22, each of which is provided with fingers 4 which engage incoming corn ears as they are picked and move them in direction 26 until the ears encounter the horizontal, transverse auger 28, which rotates in direction 84, and moves them along auger trough 30 to a central collection belt (not shown). Corn ears are snapped off the stalks as the stalks are moved rapidly downward through a narrow slot between the gathering chains and which underlies the fingers 24 and overlies the gap between rollers 10 and 10'. The stalks are pushed toward the ground surface by the rollers 10 and 10' and left behind on the field as the combine 12 moves forward. The use and structural features of the gathering chains, fingers, augers and belt are well known to the art and will not be described further.

Figures 4, 6, 7, 8, 9:
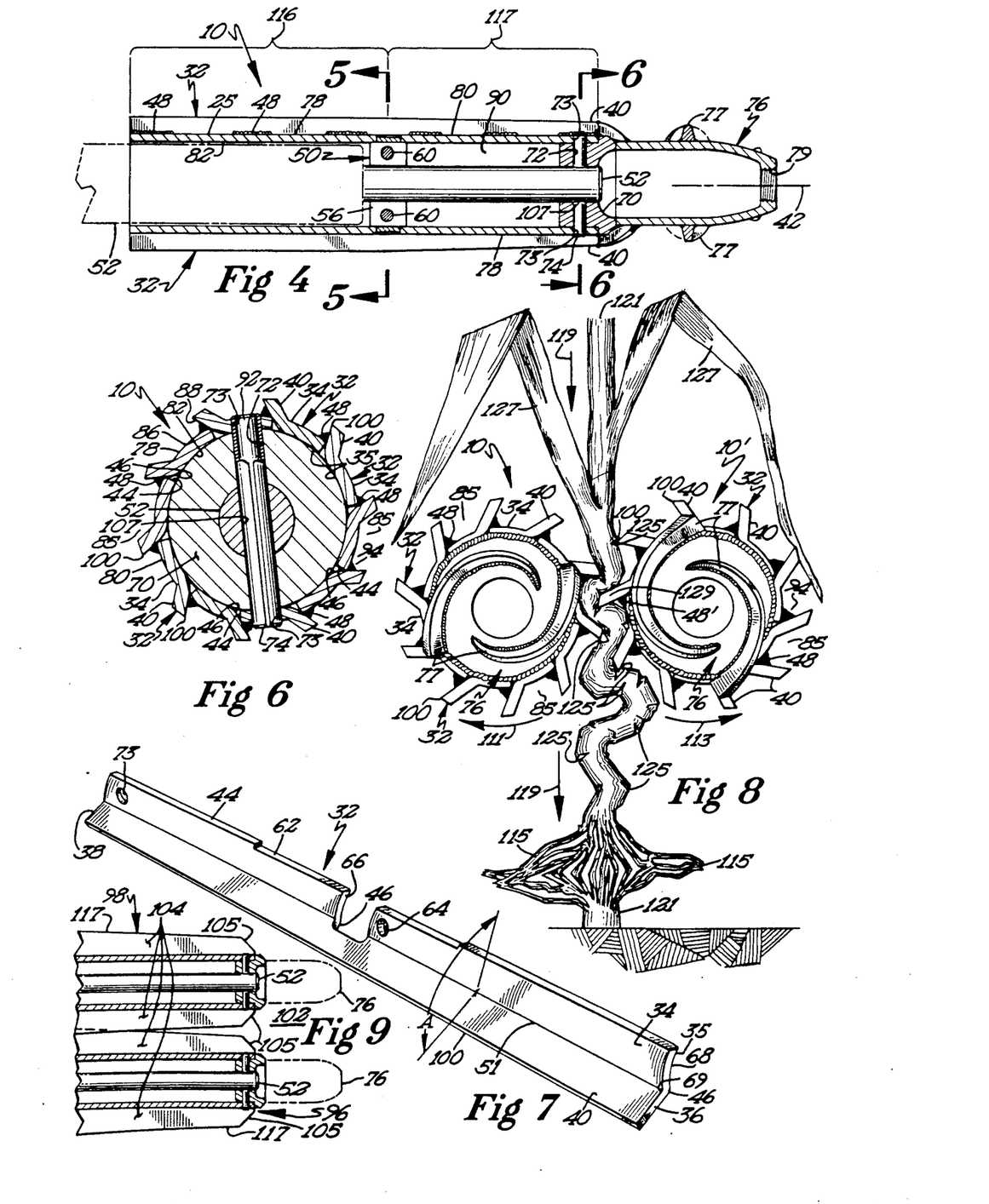
FIG. 4 is a cross sectional side view of the roller of FIG. 3 taken along cutting plane 4—4 of FIG. 3.
FIG. 6 is a cross sectional end view of the snapping roller of FIG. 4 taken in the direction of cutting plane 6—6 of FIG. 4.
FIG. 7 is a side perspective view of a rail used in constructing the snapping roller shown in FIGS. 2-8.
FIG. 8 is a front view taken along the axes of a pair of cooperating snapping rollers embodying the invention and showing the rollers in operation as they engage a corn stalk, but omitting other structural details of the combine.
FIG. 9 is a top view of a high capacity snapping roller which is an alternative embodiment of the invention.

Referring now to FIGS. 3-5 and 7, a snapping roller 10, embodying the invention, has a segmented cylindrical wall 78 and is formed of a multiplicity of individual rails or plates 32 of the type shown in FIG. 7. Although ten such rails are illustrated in the drawings as forming the roller 10 and 10', it should be understood that while ten produce excellent results, a greater or lesser number may be utilized with effective results.

Each of the rails 32 is a substantially rigid, elongated steel plate having a length substantially longer than either its width or thickness. Seven gauge steel plate having a thickness of 0.185 inches has been found effective as a rail material. As best shown in FIG. 7, each rail has an elongated wall defining segment 34 which extends the full length of the rail from the rear end 36 of the rail to the front end 38. Each rail also includes a stalk engaging blade 40 which has an intersection 51 with the wall defining segment 34, is integral with the segment 34 and also extends all along the length of the rail. The blade 40 is angled outwardly from the wall defining segment 34 at bend 51 at an angle A which is between 90 and 150 degrees, with the angle being substantially constant along the length of the rail, the preferred angle being 135 degrees.

As best shown in FIGS. 6 and 7, the wall defining segment 34 of each rail is arcuate and formed with a curvature 35 substantially equal to the radius of the snapping roller 10 so that when all of the rails are placed side by side in contacting relationship and with their lengths parallel to the central axis 42 of the roller so as to collectively define a cylinder, the segmented snapping roller 10 results. By forming the curvature 35 in the wall defining segment 34 and also bending the blade 40 outwardly from the wall defining segment at bend 51, both blade and wall defining segment become stronger, more rigid and highly resistant to breaking, bending or twisting.

While the roller 10 is shown as having wall defining segments with curvatures 35 that are of constant radius, it is not essential that the curvature be of constant radius to be effective to form a segment of the roller. The wall defining segment may be flat or have other bend or curve configurations to increase strength and rigidity, and all such alternatives are within the purview of the invention. It is believed, however, that the shown configuration is the best and most reliable structure.

To form and assemble the snapping roller 10, the individual rails 32 are clamped in a suitable jig with the leading longitudinal edge 46 of each wall defining segment 34 contacting the trailing longitudinal edge 44 of the wall defining segment 34 of the adjacent rail, as best shown in FIG. 6. The adjacent segments are then permanently joined together by placing intermittent welds 48 (FIGS. 3-5) along a generally straight line path 25 along and interconnecting the adjacent rails 32. The welds 48 are placed only on the outside 80 of the cylindrical wall 78 and are not needed on the inside 82 of the segmented wall. The welds 48 extend between the obverse surface 86 of the rail and the reverse surface 88 of the adjacent rail Unlike the prior art roller 11 of FIG. 1, a weld is not required on both front and rear surfaces 21 and 23 of the blade 15 where the blade joins the core 13. The invention requires no more than half the welding needed for attachment of blades to the core by the prior art roller 11 of FIG. 1, and the elimination of the row of rough protruding weld joints 17 along the snapping roller 11 (FIG. 1) reduces the amount of snagging and clogging which might otherwise occur between corn stalks and the welds 17 of the roller. In place of the row of rough welds 17 utilized in prior art roller 11, the roller 10 has a smooth, angular bend 51 along which stalks can slide freely in directions parallel to the central axis 42, resulting in a low friction area all along each blade and extending from the row 25 of welds 48, across smooth segment 34 and ending at sharpened blade edge 100.

As best shown in FIGS. 4 and 5, an internal collar 50 is positioned within the hollow interior chamber 90 of the snapping roller and is used to clamp the roller 10 onto the drive shaft 52 of the headers 14 and 16.

The collar 50 includes two semi-circular steel elements 54 and 56 which contact the reverse face of the rails 32 of the snapping roller and are welded to the rails, as described hereafter. The elements have a pair of narrow slots 58 (FIG. 5) therebetween, allowing the elements to be tightened against the combine drive shaft 52 when machine bolts 60 are tightened in threaded apertures 61. In order to allow some slight contracting movement of the snapping roller 10 to permit the slot 58 to narrow somewhat when the collar elements 54 and 56 are tightened, the two rails 32 which directly confront the slot 58 are provided with slots 62 (FIGS. 5 and 7) which communicate with slots 58. Such slots 62 may be formed in the rails by punching and need not be milled. While only the rails immediately confronting the slots 58 need have the slot 62, it can be desirable to form all of the rails with identical slots 62 to have them interchangeable so as to avoid manufacturing a specially shaped rail having the slot 62. It should be understood, however, that a snapping roller formed of rails in which some, but not all, of the rails are provided with slots 62 is also within the purview of the invention.

A notch 66 (FIGS. 3, 5 and 7) is also punched from each rail 32 to allow operator access to the heads of the machine bolts 60 to permit insertion and turning of the bolts. While only the rails confronting the bolts 60 must have the notches 66, it can be desirable to form each rail with such a notch in order to avoid making specialized rails. It will be understood, however, that a snapping roller formed of rails where some, but not all, of the rails have notches 66 is within the purview of the invention.

Each rail 32 has a punched-out aperture 64 which confronts collar 50 and is adjacent the notch 66 to allow a rosette weld 49 to be placed in the aperture 64 to firmly attach the collar elements 54 and 56 to each rail.

While it is preferred that the rails 32 be attached to collar 50 by rosette welds, such attachment can be made by screws having their heads countersunk into the rails and threaded into the collar elements Such an alternative fastening arrangement is within the purview of the invention, although welding is the preferred means under most circumstances.

Referring now to FIGS. 4 and 6, the leading end of the snapping roller 10 has a front collar 70 which carries nose cone 76 and has a transverse bore 72 through the collar. The bore 72 communicates with bores 73 formed in at least the two rails 32 which confront the bore 72.

To avoid manufacturing specialized rails, all the rails may be made with a front bore 73. The collar 70 is welded to the front ends 38 of the rails 32 after assembly of the rails into the roller 10. The bore 72 of the collar 70 is intended to receive a roll pin 74 which is driven through apertures 73 and 72 and bore 107 of drive shaft 52 so as to firmly attach the snapping roller 10 to the front end of the header drive shaft 52 and also assists in orienting the roller for timing purposes so that its blades are properly positioned to cooperate with the blades of roller 10'. It has been found helpful to drive a second roll pin 92 within the pin 74 as best shown in FIGS. 3 and 6.

The internal collar 50 and the front collar 70 collectively comprise one means for attaching the roller 10 to the header drive shaft 52, but it should be understood that other known structures may be substituted for such attachment and are within the purview of the invention.

The conventional nose cone 76 is welded to the collar 70 and has two external helixes 77 which merge with a pair of the blades 40 and engage and move the corn stalks into the blades of the snapping rollers. A threaded socket 79 may be provided at the front of the nose cone 76 to attach a removal device for forcing the shaft 52 from the roller. While the snapping roller has been shown with a pair of helixes 77, it should be understood that the roller may be constructed without the helixes, as will be described hereafter.

Although it is preferred to weld all of the adjacent rails to one another with welds 48 to form the cylindrical segmented snapping roller, it is also possible to eliminate the welds and connect the rails to the collars 50 and 70 using screws threaded into the collars with the screw heads countersunk into the rails. Such an alternative would allow easier replacement of individual rails while avoiding most snagging of corn stalks, and such alternative retaining means is within the purview of the invention. Use of the welds 48 between adjacent rails as a retaining means does, however, result in a more rigid snapping roller and is believed to be more effective than a screw attachment arrangement.

While only the snapping roller 10 has been described in detail, it should be understood that the cooperating roller 10' shown in FIG. 1 is identical in principle to the roller 10, except that the rollers 10 and 10' are left and right hand rollers, as best seen in FIG. 8, with the roller 10' being the mirror image of the roller 10 as viewed in cross section along the central axes 42 of the rollers.

Although the invention has been described as useable with a corn harvesting combine, it should be understood that the term, "combine", is used in a broad sense to include any mechanical corn harvesting apparatus which utilizes rollers for engaging the stalks and removing the corn ears.

Manufacturing the roller 10 begins with fabricating the individual plates or rails 32, each of which will initially be generally flat, rectangular, elongated and preferably formed of seven gauge sheet steel having a thickness of approximately 0.185 inches.

After initial forming of each flat plate, the apertures 64 and 73 and the slots 62 and 66 are formed by stamping. This step is in direct contrast with the manner in which the prior art roller 11 of FIG. 1 was made. When snapping roller 11 was formed, the blades 15 were first welded to the cylindrical one piece core 13, and then all of the access apertures 27 and slots 29 were individually drilled or milled Such drilling and milling operations are slow and expensive, and these costly operations are successfully avoided by constructing the roller 10 using a plurality of rails 32 in accord with the invention.

After stamping out the apertures and slots from the plate 32, each plate is placed in a die and the angled bend 51 and the arcuate cross section 35 are simultaneously formed, resulting in the plate or rail 32 acquiring the configuration shown in FIG. 7.

As an alternative manufacturing method, it is possible to form the plate 32 in a single forming operation in which the curvature 35, the bend 51, and all apertures and slots are punched and shaped substantially at one time, and such an alternative is within the purview of the invention. As best illustrated in FIG. 8, both a left hand snapping roller 10 and a right hand roller 10' are needed, and both left and right hand rails may be formed using the same tooling.

After forming of the individual rails, the rails are arranged about a central axis 42 to form a segmented cylinder having a cross section like that shown in FIG. 6. Typically, eight to twelve such rails will be used to form the segmented roller 10, although for most applications, ten rails are preferred.

It has been found effective to weld the rails while using a clamping jig to hold the rails in a generally cylindrical configuration. While clamped in the jig, the rails are welded to one another, with the longitudinal leading edge 46 of the wall defining segment 34 of one rail 32 contacting the trailing edge 44 of the wall defining segment 32 of the adjacent rail. As best shown in FIGS. 3 and 6, individual and intermittent welds 48 are applied between the obverse face 86 of the wall defining segment 32 of one rail and the reverse face 88 of the blade of the adjacent rail, and the blade 40 overlies the obverse surface 86 and the welds 48. A plurality of distinct welds are applied so as to interconnect and join these surfaces 86 and 88 and are spaced from one another along a generally straight line path 25 (FIG. 4) within the vee or alcove 94 formed between the segment 34 and the overlying blade 40. By positioning the row 25 of welds 48 in the alcove 94, the welds are kept generally clear of the corn stalks which, during operation, move through the channels between adjacent blades 40; this helps to reduce clogging of the roller during high capacity operation, as will be described further hereafter.

After welding of all the adjoining rails is completed, the intermediate collar 50 is positioned within the hollow chamber 90 of the roller so as to confront the apertures 64. Rosette welds 49 are applied to the collar 50 through the apertures 64, filling the apertures to provide a permanent, highly reliable bond between collar and roller wall 78. Before welding, the collar 50 is oriented so that the threaded bores 61 of the collar confront and communicate with a pair of opposed notches 66 to permit loosening or tightening of the machine bolts 60 when the collar is tightened on the header drive shaft 52.

A front collar 70 extends into the chamber 90 at the front ends 38 of the roller and is welded to the rails around the circumference of the collar. A standard helical nose cone 76 is welded to the collar 70 and directs the corn stalks to the knife blades.

The snapping roller 10 is next mounted on a lathe to turn the roller about its central axis 42, and appropriate cutting tools are utilized to machine and sharpen the outer knife edge 100 of each blade 40 and to taper the blade along blade portion 117 (FIG. 4) which joins blade area 116 where the blade width is constant The taper 117 extends from area 116 to the front end of the roller so that the blades extend outward from the cylindrical wall 78 at the front end of the roller no more than the width of the helix 77 on the nose cone where the helix 77 joins two of the blades 40.

The machining operation is effective to evenly sharpen each blade 40 so that the knife edge 100 of the blade is consistently equidistant from the central axis 42 in portion 116 and uniform along portion 117 By forming the blades integrally with the wall defining segments 34 and utilizing the bend 51 and the arcuate cross section 35, each blade is significantly more rigid than has been possible with the prior art roller 11 of FIG. 1. The unwanted flexing of the blades associated with the roller 11 is avoided with the present invention, resulting in a more uniform roller with uniformly spaced and sharpened cutting edges 100 and all blades having the same angle A. The segmented individual rail construction used with the invention successfully avoids the irregular blade alignments possessed by the prior art roller of FIG. 1. When the individual blades 15 of roller 11 were welded to the central core 13, the high welding heat would cause the blades 15 to flex and warp unpredictably so as to have final alignments that were not parallel to one another or the axis 42 or even consistent, and which resulted in warped, irregular blades and non-uniform width channels between blades The prior art blades 15 of FIG. 1 were also more flexible so that the outermost edge of the blades flexed away from the cutting tool during the machining operation, resulting in the sharpened edges of the blades being non-uniform and not equidistantly positioned from the central axis of the roller. These problems are substantially eliminated with the roller 10.

The snapping roller 10 can also be used without the helix 77 on nose cone 76. When the helix is omitted, it is desirable during the machining operation to grind off the front corner 105 of each blade 104 as shown in FIG. 9 to provide a stalk entry zone 102 in which the blades more gradually engage the corn stalk.

The angling of the front end of the blade 104 as seen in FIG. 9 can also be achieved by cutting off the leading corner 105 of the blade during the operation in which the flat plate 32 is formed, and such alternative is within the purview of the invention.

After the snapping roller 10 has been fully formed and the blade edges sharpened by machining, the roller is given a chromium coating having a thickness on the order of 0.0025 inches to harden its outer surface and prolong its use life.

In operation, the improved snapping rollers 10 and 10' are installed on a pair of header drive shafts 52 having their center-to-center distances about four inches apart, with the shaft 52 being slidably inserted from the rear of each of the snapping rollers and passing through the intermediate collar 50 and the front collar 70. Each pair of cooperating rollers includes a left hand roller 10 and right hand roller 10', as shown in FIG. 8, and the blades 40 of the rollers are staggered so that the blades of one roller do not contact the blades of the cooperating roller, since it is undesirable to completely sever the corn stalk.

After sliding the rollers onto the drive shafts 52, the bores 72 and 73, which extend through the roller wall and front collar, are aligned with the drive shaft aperture 107. The roll pin 74 is forced through the communicating apertures 72, 73 and 107 and secures the front end of the drive shaft to the front collar. It has been found helpful to force a second drive pin 92 within the first pin 74 to increase long term retention of the pins in the bores.

The operator next inserts the machine bolts 60 (FIGS. 3 and 5) through the notches 46 in the rails 32 and, using a wrench, advances the bolts 60 along the threaded aperture 61 to tighten the elements 54 and 56 of intermediate collar 50 against the shaft 52. As the bolts are tightened, the slots 58 between the elements close slightly. The communicating rail slots 62 adjacent the bolts allow the elements 54 and 56 to converge as the slot 62 narrows and permits secure gripping of even a worn drive shaft. Installation is now complete.

As the combine 12 drives forwardly along a row of corn stalks in direction 18 (FIG. 2), the snapping rollers 10 and 10' (FIG. 8) engage the stalks. The rollers 10 and 10', each of which includes the nose cone 76 with twin helixes 77, first engage the corn stalks with the helix 77 as the rollers 10 and 10' rotate in directions 111 and 113, respectively.

As the helix 77 of each nose cone 76 engages the corn stalks as the combine moves forward, the stalks are guided into the tapered blade area 117 (FIG. 4). Because the spacing between interacting blades 40 in taper zone 117 is greater than the spacing between blades in non-tapered zone 116, the corn stalks are more readily received within the tapered zone 117 of the snapping roller blades and more easily work their way rearwardly along the roller toward end 36. It will be appreciated that the corn stalks are being moved rearwardly along the roller at approximately the forward travel speed of the combine.

Referring now to FIG. 8, as the snapping rollers 10 and 10' engage the corn stalk 121 with their blades 40, the sharpened edges 100 of the blades cut into the corn stalk to aggressively engage the stalk without severing the stalk. As the rollers 10 and 10' rotate, the engaged blades have little slippage and apply a powerful downward force 119 along the longitudinal axis of the corn stalk 121. As this initial force is first applied to the stalk 121, the stalk is virtually upright, and the powerful axial force supplied by the rollers drives the stalk violently at the ground and literally shatters the lower stalk, with stalk fibers 115 virtually exploding outward in directions radial to the stalk 121.

As the rollers 10 and 10' continue to turn, the blades continue to engage and cut into the outer periphery of the corn stalk at new locations, as best shown by cuts 125, none of which sever the stalk 121 completely, but which effectively cut open the outer layer of the stalk to speed dehydration and deterioration of the stalk. As shown in FIG. 8, the stalk is sharply bent and mutilated as it goes through the rollers, with the rollers aggressively cutting into the stalk a predetermined but adequate amount to retain control of the stalk and draw it swiftly, steadily downward as the combine moves forward. It is preferred that each roller include ten rails to assure contact of at least five blades with the stalk to assure aggressive engagement with the stalk, reduce slippage between roller and stalk, and rapid movement of the stalks through the snapping rollers. Even with the extensive bending shown in FIG. 8, the stalk 121 will straighten itself out considerably after leaving the rollers, but the strong bending and partial cutting of the stalk by the blades 40 is highly effective in speeding the drying out, decay and decomposition of the stalk.

While the stalk 121 is shown in FIG. 8 as still being intact below the rollers, the extensive bending and cutting caused by the rollers in combination with the pull supplied by the moving combine will frequently produce complete breakage of the stalk below the rollers, and even more so when stalks are relatively dry. Test runs in dry corn have resulted in standing stalk residue having lengths under 15 inches.

While only the damage to the stalk 121 is shown in FIG. 8, it should be understood that the leaves 127 incur greater damage than the stalk 121 and are destroyed to a substantially greater extent than the stalk. Higher portions of the stalk which are thinner and more frail incur more extensive damage, and the stalk is badly mutilated and completely severed again and again at levels above the corn ears.

Referring again to FIG. 8, each overlying blade, as exemplified by blade 129 of roller 10', pushes the stalk 121 away from the weld 48' as the blade strikes the stalk. This intercepting action of the blades keeps the stalk largely out of engagement with the welds 48 and reduces the extent to which the fibers of the stalk 121 will snag or catch on the welds as the stalk partially fills and moves along the channels 85 between blades, thereby reducing the tendency of the rollers to clog even during high speed harvesting and assuring faster harvesting with few lost corn ears. It will be appreciated that should the corn stalk snag on welds or be slowed down due to a narrowing of the channel between blades as with the roller 11, the likelihood of additional corn stalks snagging and clogging against the first stalk increases substantially, and as clogging occurs, the likelihood of stalk breakage within the rollers increases. By avoiding such breakage, the amount of lost corn ears is reduced with the invention and the harvest level increased.

The use of the segmented rails 32 to form the snapping roller and the presence of the curvature 35 and bend 51 in each rail makes each rail stronger and more rigid and reduces the amount of flexing of the blade 40 during operation. With reduced flexing of the blades, the spacing between adjacent blades is more constant, and the cross sectional area of the channels 85 between blades can be substantially constant along the length of the roller. By keeping the blades rigid and the channel cross section constant, there are no narrowing bottlenecks along the channels, the corn stalks move more freely along the channels, and clogging and unwanted, premature stalk breakage is significantly reduced. Due to the greater rigidity of the blades 40 resulting from the use of the curvatures 35 and bends 51, the sharpened edges of the blades 40 are all substantially equally spaced from the center axis 42 of the rollers along the untapered portion 116 of the blade, and penetration of each blade into the stalk is relatively constant and predictable, making it possible to aggressively engage each corn stalk and pick the ears before cutting the stalk to a point where it breaks or is completely severed.

The same result is achieved along the tapered portion 117 of the rollers where the sharpened edges 100 are not at a constant distance from the axis 42 but at any given point along the axis 42, the sharpened edge of each blade is substantially the same distance from the axis.

The stronger roller which results because of the bends and curvatures also reduces the tendency of the foremost, cantilevered ends 38 of the rollers 10 and 10' to be forced laterally apart during operation and to lose the parallelism between the central axes of the rollers. Accordingly, the spacing between the rollers 10 and 10' can be more predictably maintained and much less corn stalk slippage occurs near the front end than was present with prior art rollers.

Referring now to the alternative embodiment of the snapping roller as shown in FIG. 9, it should be understood that the operation of the rollers 96 and 98 is substantially identical to that described in conjunction with the rollers of FIG. 8, except that the rollers 96 and 98 do not utilize a helix 77 on the nose cone 76. Instead, corn stalks engaged by the rollers 96 and 98 enter a stalk receiving zone 102 formed by the cutaway forward corners 105 of the tapered rollers and are then engaged by the blades in the same fashion as described in conjunction with the embodiment of FIGS. 2-8.

The corn crop encountered in any geographic area is always somewhat unpredictable in that its moisture levels can vary considerably depending on weather, individual field elevation, irrigation efforts and even the specific variety of corn under cultivation. Some crops must be cut at an earlier stage in their growth than others, and sweet corn is always harvested under much higher moisture conditions than field corn. Because it is generally impractical to change snapping rollers for differing crop conditions, weather or corn variety, it is essential that the combine's snapping rollers be a workable compromise which can function under all these conditions and also under a range of likely harvesting speeds. Such speed range must include high speed operation and be capable of processing the ears in the four to eight mile per hour range. The disclosed rollers of FIGS. 2-9 are highly effective at the upper end of this speed range and even more effective at slower speeds. As the speed is reduced, the amount of destruction caused to the stalk as it leaves the bottom of the snapping roller is increased. The aggressive engagement between the roller 10 and the stalk will ram the stalk against the ground more than once under slow speed conditions and produce multiple shattering of the type shown at 115 in FIG. 8. Such destruction is helpful to the farmer in that much less subsequent processing is required to cut or grind the corn stalks prior to plowing and seeding of the next crop.

While the preferred embodiments of the present invention have been described, it should be understood that various changes, adaptations and modifications may be made therein without departing from the spirit of the invention and the scope of the appended claims.

What is claimed is:

1. A snapping roller having a segmented cylindrical wall with a central axis and usable on a header drive shaft of a corn harvesting combine in cooperation with a second snapping roller to grip and move corn stalks therebetween, said snapping roller comprising:

a multiplicity of discrete, rigid, elongated rails, each said rail having a length substantially longer than its width or thickness and each said rail including an elongated wall defining segment and an elongated corn stalk engaging blade integral with, extending from and angled relative to said wall defining segment;

each said wall defining segment contacting a pair of adjacent wall defining segments of said multiplicity of rails and cooperating with such adjacent wall defining segments to form said segmented cylindrical wall of said snapping roller and being equally spaced from and substantially parallel to said central axis of said snapping roller and defining a hollow chamber along said central axis bounded by said wall defining segments for receiving the header drive shaft, said blades of all said rails extending outwardly from said segmented cylindrical wall;

means retaining said wall defining segments in fixed relationship relative to one another and about said central axis to maintain said wall defining segments as said segmented cylindrical wall; and means for attaching said snapping roller to the header drive shaft.

2. The snapping roller of claim 1 wherein each said blade has an intersection with the integral wall defining segment and each said blade extends outwardly from said cylindrical wall with the angle between said wall defining segment and said blade being substantially constant all along the intersection between said blade and said wall defining segment.

3. The snapping roller of claim 2 wherein said angle is between 90 and 150 degrees.

4. The snapping roller of claim 2 wherein said angle is substantially 135 degrees.

5. The snapping roller of claim 2 wherein blades are positioned around said segmented cylindrical wall at intervals of substantially 36 degrees.

6. The snapping roller of claim 1 wherein at least one said wall defining segment has an arcuate cross section with the radius of curvature of said arcuate cross section being substantially equal to that of said cylindrical wall.

7. The snapping roller of claim 1 wherein each said rail has an obverse surface and a reverse surface, each said wall defining segment has a leading and a trailing longitudinal edge, and said means for retaining said wall defining segments is a plurality of welds situated along substantially straight line paths generally parallel to said longitudinal edges of said contacting wall defining segments.

8. The snapping roller of claim 7 wherein said welds along said straight line paths extend between the obverse surface of each rail and the reverse surface of the adjacent contacting rail.

9. The snapping roller of claim 7 wherein all said welds are situated outside of said hollow chamber.

10. The snapping roller of claim 7 wherein the welds between two adjacent rails are placed within an alcove formed between the blade of a first rail and the wall defining segment of an adjacent rail to reduce the obstructing of the channels between adjacent blades and inhibit clogging by corn stalks.

11. The snapping roller of claim 1 wherein said means for attaching includes at least one collar positioned within said hollow chamber, a plurality of said rails have apertures communicating with said collar, and said apertures are filled with rosette welds which engage said collar to attach said collar to said rails.

12. The snapping roller of claim 1 wherein the roller has a front end and a rear end and all said blades have a cutaway corner at said front end to define a stalk entry zone for the pair of cooperating rollers.

13. The snapping roller of claim 1 wherein said multiplicity of rails includes at least 8 rails.

14. The snapping roller of claim 1 wherein said multiplicity of rails includes at least 10 rails.

15. The snapping roller of claim 1 wherein each said rail is formed of number seven gauge steel.

16. A method for making a snapping roller having a segmented wall comprising:
    forming a multiplicity of flat, generally rectangular, elongated plates;
    bending each plate to form an elongated wall defining segment and an elongated integral blade having front and rear ends, the blade extending at an angle to the wall defining segment so the bend increases the rigidity and strength of each plate, each wall defining segment having a leading edge and a trailing edge, with each segment and blade having obverse and reverse surfaces;
    assembling the plates in a jig to orient the plates about an elongated central axis wherein the leading edge of each wall defining segment contacts the trailing edge of an adjacent wall defining segment and all the wall defining segments cooperate to form said segmented wall; and
    attaching the plates relative to one another prior to removal of the jig to retain the wall defining segments as the segmented wall and to retain the blades in a predetermined outwardly angled orientation relative to said segmented wall.

17. The method of claim 16 and further including the step of turning the segmented snapping roller about its central axis on a lathe and machining a sharpened edge on each blade with with the sharpened edge of each blade being the same distance from the central axis of the roller as the sharpened edges of the remaining blades, while utilizing the rigidity of the bend to prevent the blade from substantially randomly flexing during machinging.

18. The method of claim 17 wherein the step of attaching the plates includes welding the obverse surface of each wall defining segment to the reverse surface of the adjacent blade.

19. The method of claim 18 wherein during welding, a row of welds is applied between each two adjacent plates.

20. The method of claim 19 wherein a portion of the blade is machined at an angle during turning to taper the blade so as to define a stalk entry zone.

21. The method of claim 18 and including the step of bending each wall defining segment to give the segment an arcuate cross section so as to further increase the strength and rigidity of each plate, wherein the step of forming the arcuate cross section in each plate orients the concave portion of the arcuate cross section to face a direction generally opposite to the concavity of the bend between blade and wall defining segment.

22. The method of claim 17 wherein each blade has an outer front corner at its front end and further including the step of turning the roller about its axis and machining off the front corner of each blade to define a stalk entry zone at the front of the roller.

23. The method of claim 16 wherein each blade has an outer front corner and further including the step of removing the front corner of a plurality of blades to define a stalk entry zone.

24. The method of claim 16 and including the step of bending each wall defining segment to give the segment an arcuate cross section so as to further increase the strength and rigidity of each plate, wherein the step of forming the arcuate cross section in each plate orients the concave portion of the arcuate cross section to face a direction generally opposite to the concavity of the bend between blade and wall defining segment.

25. The method of claim 16 wherein the attaching of the wall defining segments is done by welding each wall defining segment to the blade of the adjacent plate and placing the welds in an alcove formed between the wall defining segment of a first plate and the blade of an adjacent plate to thereby reduce obstruction of the channel between adjacent blades so as to inhibit clogging of the channels with corn stalks.

26. The method of claim 16 and including step of bending each wall defining segment to give the segment an arcuate cross section so as to further increase the strength and rigidity of each plate, wherein the roller has a substantially cylindrical wall and the arcuate cross section is formed with a radius of curvature substantially equal to the radius of the cylindrical wall.

27. The method of claim 16 and including the step of stamping apertures in at least some of the plates while the plates are flat.

28. A method of assembling a pair of cooperating adjacent, cantilevered, hollow snapping rollers of a corn harvesting combine to maintain the parallelism of the axes of the rollers so as to resist divergence of the roller axes during harvesting use comprising:
    forming a multiplicity of discrete, rigid, elongated rails with each rail including a blade and an integral wall defining segment angled relative to the blade; and attaching the wall defining segments to one another to form a segmented snapping roller wall with the blades extending outwardly and the segments rigidly fixed relative to each other.

29. The method of claim 28 and further including forming each snapping roller of ten rails to assure contact of at least five blades with the stalk to assure aggressive engagement with the stalk, reduced slippage between roller and stalk, and rapid movement of the stalks through the snapping rollers.

30. The method of claim 28 and further including the step of turning the segmented snapping roller about its central axis on a lathe and machining a sharpened edge on each blade with each said sharpened edge being the same distance as the sharpened edges of other blades from the central axis of the roller, and using the rigidity of the bend and curvature of each rail to prevent the blade edge from substantial random flexing during machining.

31. The method of claim 28 wherein the wall defining segments are rigidly fixed relative to each other by welding each rail to its adjacent rail and placing the welds in an alcove formed between the blade of a first rail and the wall defining segment of an adjacent rail to thereby reduce the obstructing of channels between adjacent blades and inhibit the clogging of the channels with corn stalks.

32. A pair of cooperating, segmented, cylindrical walled snapping rollers having parallel central axes and usable with a corn harvesting combine to inhibit clogging by high volumes of corn stalks, to remove corn ears from the stalks before breaking or severing of the stalks, and to then mutilate the stalk to quicken deterioration of the stalk remnants comprising:

each said snapping roller being formed of a multiplicity of rigid elongated rails with each rail including an elongated wall defining segment and an elongated corn stalk engaging blade integral with, extending from and forming an angle with said wall defining segment;

each said wall defining segment and each said blade having obverse and reverse surfaces;

each said wall defining segment contacting a pair of adjacent wall defining segments of said multiplicity of rails and cooperating with such adjacent segments to form the segmented cylindrical wall and being spaced around and substantially parallel to the central axis of the snapping roller;

each said blade overlying a said wall defining segment of a adjacent rail and cooperating with such wall defining segment to form an elongated alcove between said blade and said wall defining segment;

a multiplicity of welds arranged along a generally straight path and connecting the reverse surface of the blade of one rail to the obverse surface of the wall defining segment of the adjacent rail for each pair of adjacent rails;

each said blade having a sharpened edge positioned equidistant from the central axis of said snapping roller to permit said blades to cut into the stalk a predetermined distance adequate to firmly grip the stalk while avoiding complete stalk severance;

said pair of snapping rollers being oriented relative to each other on said combine such that said blades of the rollers are staggered so as to avoid direct convergence of said blades of the two rollers and complete severing of the stalk;

the said welds lying on each said straight path being positioned deep within said alcove to help keep the welds away from stalks moving through the rollers;

said overlying blades being positioned to contact and repel corn stalks from said alcoves to prevent the stalks from deeply penetrating said alcove and catching on said welds, thereby encouraging smooth flow of the stalks through the rollers and inhibiting clogging.

33. The combination of claim 32 wherein said plurality of rails is ten rails.

34. The combination of claim 32 wherein said alcove subtends an angle between said overlying blade and said wall defining segment and said angle is between substantially 30 and 60 degrees.

35. The combination of claim 34 wherein said angle is substantially 45 degrees.

36. The combination of claim 32 wherein each said rail is formed of seven gauge steel.

37. A snapping roller having a segmented wall with a central axis an usable on a header drive shaft of a corn harvesting combine in cooperation with a second snapping roller to grip and move corn stalks therebetween, said snapping roller comprising:

a multiplicity of discrete, rigid, elongated rails, each said rail having a length substantially longer than its width or thickness and each said rail including an elongated wall defining segment and an elongated corn stalk engaging blade integral with, extending from and angled relative to said wall defining segment;

each said wall defining segment contacting a pair of adjacent wall defining segments of said multiplicity of rails and cooperating with such adjacent wall defining segments to form said segmented wall of such said snapping roller and being equally spaced from and substantially parallel to said central axis of said snapping roller and defining a hollow chamber along said central axis bounded by said wall defining segments for receiving the header drive shaft, said blades of all said rails extending outwardly from said segmented cylindrical wall;

means retaining said wall defining segments in fixed relationship relative to one another and about said central axis to maintain said wall defining segments as said segmented wall; and means for attaching said snapping roller to the header drive shaft.

38. The snapping roller of claim 37 wherein each said blade has an intersection with the integral wall defining segment and each said blade extends outwardly from said segmented wall with the angle between said wall defining segment and said blade being substantially constant all along the intersection between said blade and said wall defining segment.

39. The snapping roller of claim 38 wherein said angle is between 90 and 150 degrees.

40. The snapping roller of claim 37 wherein each said rail has an obverse surface and a reverse surface, each said wall defining segment has a leading and a trailing longitudinal edge, and said means for retaining said wall defining segments is a plurality of welds situated along substantially straight line paths generally parallel to said longitudinal edges of said contacting wall defining segments.

41. The snapping roller of claim 40 wherein the welds between two adjacent rails are placed within an alcove formed between the blade of a first rail and the wall defining segment of an adjacent rail to reduce the obstructing of the channels between adjacent blades and inhibit clogging by corn stalks.

42. The snapping roller of claim 37 wherein said means for attaching includes at least one collar positioned within said hollow chamber, a plurality of said rails have apertures communicating with said collar, and said apertures are filled with rosette welds which engage said collar to attach said collar to said rails.

43. The snapping roller of claim 37 wherein the roller has a front end and a rear end and a plurality of said blades have a cutaway corner at said front end to define a stalk entry zone for the pair of cooperating rollers.

* * * * *

UNITED STATES PATENT AND TRADEMARK OFFICE
CERTIFICATE OF CORRECTION

PATENT NO. : 5,040,361

DATED : August 20, 1991

INVENTOR(S) : Richard A. Briesemeister

It is certified that error appears in the above-identified patent and that said Letters Patent is hereby corrected as shown below:

Col. 1, line 9: After the word "sweet", delete ",".

Col. 1, line 16: After the word "forward", insert --.--.

Col 1, line 21: After the word "that", delete ",".

Col. 2, line 36: After the word "plowing", insert --.--.

Col. 2, line 51: After the word "conditions, insert --.--.

Col. 3, line 12: Delete "90'" and insert --90°-- therefor.

Col. 3, line 26: After the word "blades", insert --.--.

Col. 3, line 26: After the word "variation" delete ",".

Col. 3, line 44: After "therebetween" insert --.--.

Col. 5, line 13: After the word "movement" insert --.--.

Col. 6, line 12: Delete "4" and insert --24-- therefor.

Col. 6, line 19: Delete the word "and".

Col. 7, line 18: After the word "rail" insert --.--.

Col. 8, line 10: After the word "elements" insert --.--.

Col. 10, line 18: After "constant" insert --.--.

Col. 10, line 27: After "117" insert --.--.

Col. 10, line 45: After "blades" insert --.--.

Col. 15, claim 17, line 42: After the first "with", delete the second "with".

Col. 16, claim 26, line 24: After "including" insert --the--.

Col. 17, claim 32, line 23: Delete "a" and substitute --an-- therefor.

Col. 17, Claim 37, line 62: Delete "an" and substitute --and-- therefor.

UNITED STATES PATENT AND TRADEMARK OFFICE
CERTIFICATE OF CORRECTION

PATENT NO. : 5,040,361

DATED : August 20, 1991

INVENTOR(S) : Richard A. Briesemeister

It is certified that error appears in the above-identified patent and that said Letters Patent is hereby corrected as shown below:

Col. 18, Claim 37, line 15: Delete "such".

Signed and Sealed this

Eighth Day of February, 1994

*Attest:*

BRUCE LEHMAN

*Attesting Officer*     *Commissioner of Patents and Trademarks*